United States Patent Office 3,304,531
Patented Feb. 14, 1967

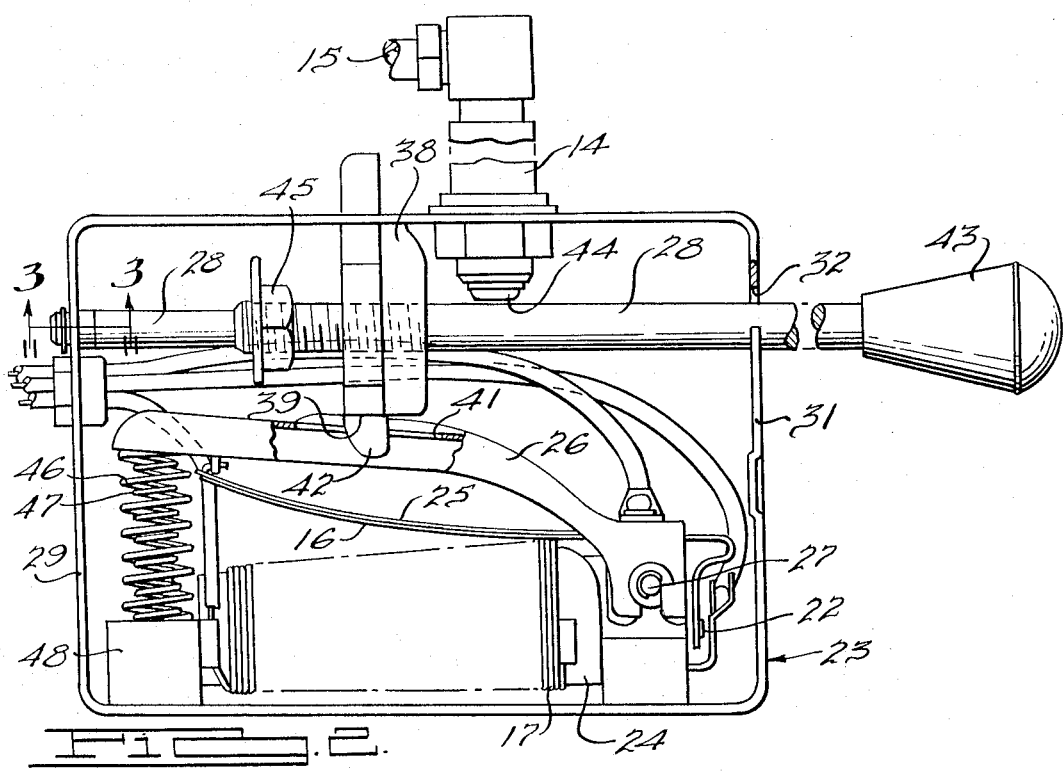
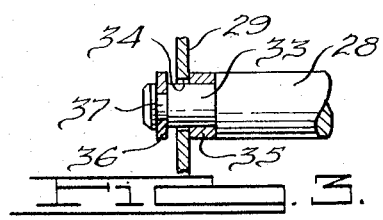
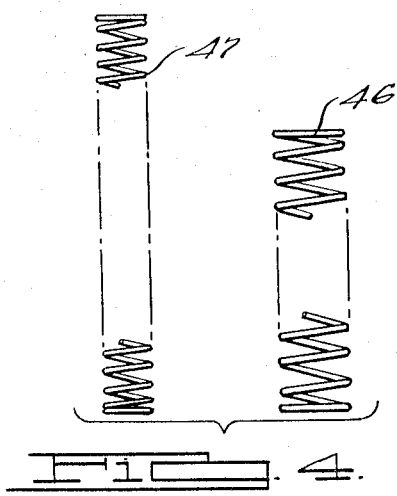
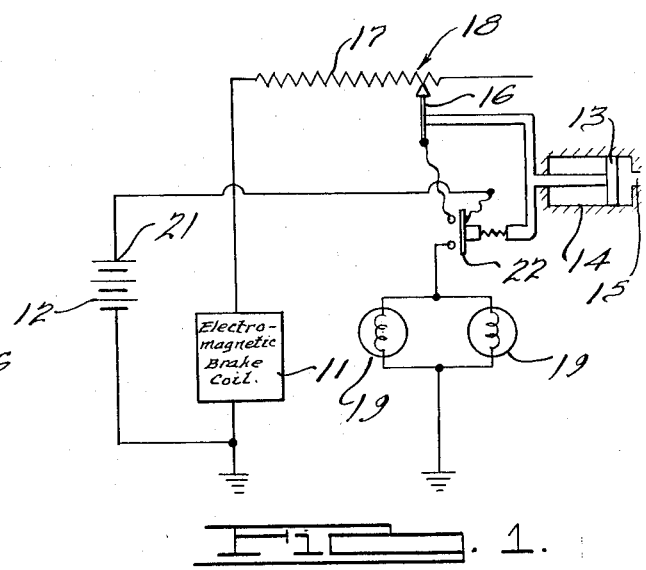

3,304,531
BRAKE CONTROLLER
Stirling A. McInnis, Troy, Mich., assignor to Syncro Corporation, Oxford, Mich., a corporation of Michigan
Filed Dec. 5, 1963, Ser. No. 328,261
2 Claims. (Cl. 338—96)

This invention relates to brake controllers, and more particularly to means for actuating rheostats which are connected to electrically actuated brakes for vehicle trailers or the like.

It is an object of the invention to provide a novel and improved brake controller of this type in which the range and degree of forces necessary to initially actuate the controller as well as to bring it to its full setting may be easily preselected.

It is another object to provide an improved brake controller of this type which is of reliable construction and at the same time is economical to fabricate and maintain.

Other objects, features and advantages of the present invention will become apparent from the subsequent description and the appended claims, taken in conjunction with the accompanying drawings.

In the drawings:

FIGURE 1 is a schematic diagram showing an electrical circuit of the type with which the controller of this invention is adapted to coact;

FIGURE 2 is a side elevational view of the novel brake controller with the housing cover removed;

FIGURE 3 is a fragmentary cross-sectional view taken along the line 3—3 of FIGURE 2 and showing the universal pivot for the actuating lever; and FIGURE 4 is a side elevational view of the inner and outer return springs shown disassembled and in their unstressed condition.

Briefly, the illustrated embodiment of the invention comprises a wound wire rheostat with a movable contact in the form of a spring-like arcuate conductor carried by an arm which is pivoted at one end and which when swung in one direction will cause the conductor to engage a progressively greater number of rheostat turns. The arm is operated by swinging a lever either manually or by means of a hydraulic piston, and the lever has a novel universal pivot construction at one end.

The means for returning the conductor supporting arm after the actuating lever has been released comprises a pair of nested helical coil compression springs. The outer spring is relatively stiff, but has little or no compression when the conductor supporting arm is in its released or non-braking position. The inner spring is weaker than the outer spring but has a substantial amount of compression when the conductor supporting arm is in its released position. The inner spring will therefore control the amount of force required to initially move the conductor supporting arm, and will also insure full return of the conductor supporting arm to its released position. The outer spring will control the amount of force needed to move the conductor supporting arm to its full braking position. By varying the sizes and characteristics of the two springs, any given combination of initial and final actuating forces for the conductor supporting arm may be selected.

Referring more particularly to the drawings, FIGURE 1 schematically illustrates an electromagnetic brake coil 11 for a brake on a vehicle trailer or the like (not shown), the coil being supplied with current from a voltage source 12 which may be a battery mounted on a tractor or towing vehicle. It is desirable that the tractor and trailer brakes be simultaneously and synchronously applied, and for this purpose a piston 13 is provided within a cylinder 14 which is connected by conduit means 15 to the hydraulic system for the tractor brakes (not shown). This piston actuates a movable conductor 16 which is in contact with a wound wire resistance 17 so as to form a rheostat generally indicated at 18 therewith. The rheostat is in series with battery 12 and brake coil 11, and increased pressure on piston 13 will decrease the resistance in the circuit thereby increasing the braking force. A pair of stop lights in the form of lamps 19 are also shown, the stop lights being connected between terminal 21 of the battery and ground so that lamps 19 will be illuminated as soon as coil 11 is initially energized by means of a switch 22 which closes upon initial movement of piston 13. Switch 22 also controls the circuit for coil 11 and rheostat 18 so that the coil will be completely de-energized when the tractor brakes are released.

The construction of the brake controller is best shown in FIGURES 2, 3 and 4, and is generally similar to that shown in Ross Patent No. 2,829,225, issued April 1, 1958. The brake controller has a housing generally indicated at 23 within which is mounted the wound wire resistance coil 17, the coil being wound on a dielectric core 24. The construction of coil 17 and core 24 may be similar to that shown and described in Patent No. 2,852,647, issued September 16, 1958, to Thomas F. Carmichael.

Conductor 16 comprises a strip of electrically conductive material backed up by a strip 25 of spring-like material, the strips being curved and secured at their opposite ends to a conductor supporting arm 26, as shown in the aforementioned patent to Ross No. 2,829,225. One end of arm 26 is adjustably pivoted to the housing by a pivot pin and slot 27, and rocking of the arm counterclockwise from the FIGURE 2 position will result in conductor 16 engaging a progressively greater number of turns of resistor 17. The connections are such that this will progressively decrease the resistance in the circuit for coil 11.

An actuating lever 28 is provided, this lever extending through the opposite side walls 29 and 31 of the housing 23 and being pivoted to wall 29, wall 31 having a slotted portion 32 for permitting lever 28 to swing clockwise from its FIGURE 2 position.

The pivot mounting means for lever 28 comprises a circular reduced portion 33 on the end of the lever which passes through a circular clearance aperture 34 having a diameter slightly larger than that of portion 33. A bushing 35 with an outer diameter equal to that of the main portion of lever 28 is slidably mounted on portion 33 and engages the inside surface of wall 29, and a snap ring 36 is secured to the projecting end of portion 33 by means of a slot 37 formed in portion 33. The spacing between retaining ring 36 and bushing 35 is somewhat greater than the thickness of wall 29, a spacing of between about one and one-half and twice the wall thickness being shown.

As a result of this construction, lever 28 may be rotated on its own axis and may also be swung counterclockwise from its FIGURE 2 position, the clearance between portion 33 and aperture 34 as well as between wall 29 and the facing surfaces of bushing 35 and retaining ring 36 permitting this swinging movement. At the same time, the free play of lever 28 in an axial direction will be limited to a relatively small amount. It should be noted that this universal connection for lever 28 will require no spherical bearings or screw threads, but may be economically fabricated using a few standard parts.

A connecting member 38 is threadably mounted on lever 28 and connects this lever with arm 26, member 38 having a shoulder 39 engageable with portions of arm 26 on opposite sides of a clearance slot 41 within which a projection 42 of member 38 is slidably disposed. The arrangement is such that clockwise rocking of lever 28 will cause counterclockwise rocking of support 26. By rotating lever 28 and thus axially shifting member 38, the relative moment arms may be varied so that when member 38 is at the extreme left end of its travel, lever 28 will have a relatively great mechanical advantage in moving arm 26, whereas the mechanical advantage will be substantially less when member 38 is in its extreme right hand position. In other words, a greater force will be required to move conductor 26 when member 38 is in its right hand position than when it is in its left hand position, the required force decreasing proportionally as member 38 moves from its right hand to its left hand position. This adjustment feature is desirable to coordinate the braking action in any given tractor-trailer combination.

The means for actuating lever 28 comprises a handle 43 secured to the outer end thereof and, alternatively, piston 13 within cylinder 14, the piston having an outer end 44 engageable with an intermediate portion of lever 28. A lock nut 45 is provided for securing member 38 in any adjusted position.

The novel means for returning arm 26 to its released or non-braking position comprises a pair of nested springs 46 and 47, seen in FIGURES 2 and 4. These are helical coil compression springs, their lower ends being supported by a portion 48 of the housing and their upper ends being engageable with the outer end of arm 26.

Spring 46 is substantially stiffer than spring 47, but its free length is such that when supporting arm 26 is released, it will have practically no stress; in fact, a very slight clearance may be provided between the unstressed length of spring 46 and arm 26 when the latter is in its released position.

Spring 47 on the other hand is substantially weaker than spring 46, but has a substantially longer unstressed length. When arm 26 is in its released position, spring 47 will therefore be substantially compressed, since it will have about the same length as spring 46, as seen in FIGURE 2.

In operation, lever 28 will be swung clockwise from its FIGURE 2 position, either manually or by piston 13, and will thereby cause arm 26 to swing counterclockwise about pivot 27. This will cause conductor 16 to engage a successively greater number of turns of resistor 17, increasing the current to coil 11.

During the initial movement of arm 26, the resistance to this movement will be mainly from spring 47. However, as the movement progresses, spring 46 will begin to compress, and since it is a substantially stiffer spring than spring 47, its force will be the main force counteracting the force on lever 28 as arm 26 reaches its final counterclockwise or full braking position, with conductor 16 engaging practically all the terms of resistor 17. In these final stages of movement, the resistance of spring 46 will be much greater than that of spring 47 which is a substantially weaker spring.

When the force on lever 28 is released, springs 46 and 47 will expand, and as arm 26 reaches its released or non-braking position, spring 47, which is still substantially compressed, will insure full separation of conductor 16 from resistor 17 and thus assure release of the brakes.

Because of the novel spring construction described above, the initial and final braking forces required on lever 28 may be readily preselected, and the range between these forces may also be predetermined within a wide area. For example, if it is desired that the amount of force required on lever 28 to initiate braking action be relatively light, but that the required force increase sharply with a great amount required for full braking, spring 47 may be made relatively weak and spring 46 relatively stiff. The opposite arrangement may be selected if a relatively high initial force is required but that the increase to the full force need only be slight; in this case, spring 47 will be made stiffer (although still substantially still weaker than spring 46) and spring 46 will be made weaker than in the first case. The preselection of force ranges and initial and final forces is also possible for any position or positions of member 38 along lever 28.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. In an electric brake controller, a wound wire resistor, a conductor engageable with progressive turns of said resistor, a conductor supporting arm to which said conductor is attached, means mounting said supporting arm for movement between a released position and a fully actuated position, means for urging said arm from its released to its fully actuated position, and resilient means for urging said arm from its fully actuated position to its released position, said last-mentioned means comprising a pair of nested helical coil compression springs, the outer spring being relatively stiff and having a relatively short unstressed length, the inner spring being relatively weak and having a relatively long unstressed length, whereby the outer spring will be substantially unstressed but said inner spring will be compressed a substantial amount when said conductor supporting arm is in its released position.

2. In an electric brake controller, a wound wire resistor, a strip conductor for engaging progressive turns of said resistor, a conductor supporting arm, means mounting said arm for movement between a released position and a fully actuated position, a pair of nested helical coil compression springs for urging said arm from its fully actuated position to its released position, a lever, a connecting member extending between an intermediate portion of said lever and said arm whereby movement of the lever in one direction will move said arm from its released to its fully actuated position, said connecting member being threadably mounted on said lever and having a slidable connection with said supporting arm, a housing for said resistor, conductor strip, conductor supporting arm, connecting member and lever, and a universal pivot mounting for said lever on said housing comprising a reduced circular portion at one end of said lever, a circular apertured portion in one wall of said housing through which said reduced portion extends, the size of said apertured portion being slightly greater than the sides of the reduced portion, a bushing slidably mounted on said reduced portion within said housing, and a snap ring mounted on said reduced portion outside of said housing, the distance between said bushing and snap ring being between about one-and-one-half times and twice the thickness of said housing wall.

References Cited by the Examiner
UNITED STATES PATENTS

| | | | |
|---|---|---|---|
| 1,485,295 | 2/1924 | Riddle | 200—6 |
| 2,456,355 | 12/1948 | Aber | 287—135 |
| 2,829,225 | 2/1955 | Ross | 338—96 |

RICHARD M. WOOD, *Primary Examiner.*

W. D. BROOKS, *Assistant Examiner.*